United States Patent Office 3,361,606
Patented Jan. 2, 1968

3,361,606
METHOD FOR REPAIR OF PNEUMATIC TIRES
William Q. Wolfson, 3000 Seminole Ave.,
Detroit, Mich. 48214
No Drawing. Filed June 18, 1964, Ser. No. 376,213
18 Claims. (Cl. 156—79)

This invention relates generally to pneumatic tires, and more particularly has reference to a method of repairing punctures in vehicular pneumatic tires by the introduction of clottable materials through the inlet valves of such tires.

Recently several products have become commercially available for repairing punctured automobile tires by the introduction of various expansible sealing materials through the tire valve, and without the necessity of removing the tire from the car. These products, known as "Repair-in-Air," "Spare Tire," etc., have taken advantage of the fact that most flat tires are caused by relatively small tears or ruptures of the tire's inner air-containing tube. It was conceived that a relatively thin layer of suitable sealant along the inner wall of the tube would repair the puncture if it could be properly introduced at the point of rupture. This latter problem was seemingly resolved by providing the sealant material in liquid form in a pressurized can having a nozzle which is adapted to open the tire valve and thereby provide communication between the contents of the tube and the tire. When this is done, the higher pressure in the can permits a movement of the sealant into the interior of the tube through the valve along with the gaseous contents of the can. The gas serves to distribute the sealant throughout the interior of the tire, thereby producing a thin film of sealant along the entire interior of the tube.

However, these products have not generally proved to be successful in practice. With the exception of very small ruptures, proper sealing of the punctures has not been obtained. Apparently, this is due to the inability of the sealant material to form a sufficiently thick permanent coating along the interior wall of the tube. The use of other adhesive substances such as casein glues, rubber cement, and epoxy resins, have similarly proved to be inadequate in a majority of the punctured automobile tires with which they have been tested.

These methods of repairing pneumatic tires have proved to be completely inadequate when used with high-pressure tubular bicycle tires. Such tires carry 80 to 135 pounds per square inch of air pressure, as opposed to the 28 p.s.i. typical of automobile tires. In tests conducted with the available purported tire-repair products, it has been found to be impossible to achieve immediate repair of this type of tire.

It is therefore the primary object of the present invention to provide a method of repairing pneumatic tire punctures by the introduction of suitable sealing materials at the point of rupture.

More particularly, it is the object of the present invention to provide a sealant suitable for injection through the valve of a pneumatic tire and which is adaptable to provide a permanent highly-efficient seal at the point of rupture.

In a preferred embodiment of the present invention which will be subsequently described in detail, these objects are met through the introduction of certain clottable proteins of mammalian body fluids in an appropriate solution at the point of rupture, followed by the introduction of a suitable clotting agent. I have found that these substances are extremely efficient even under conditions of high pressure, as in the case of high-pressure bicycle tires, and form an extremely-effective permanent air-tight seal. These substances clot very rapidly and in seconds permit reuse of the tire under maximum stress conditions.

The clottable proteins are first introduced through the tire valve, and the clotting agent then injected along with a high-pressure volume of air. The air serves to form a foam which is then distributed throughout the interior of the tube, and concentrated at the region of the puncture. The foam then clots along the tube walls, forming a continuous permanent air-tight seal having its greatest thickness at the site of the rupture.

A further advantage of employing such material as a sealant is that it effectively coats the entire interior wall of the tube and thereby forms a permanent second seal.

Another advantage of the present invention is that these clottable and clotting materials are relatively inexpensive to obtain, and hence readily adaptable for use in commercial form.

Other objects and advantages of the present invention will be more readily apparent from the following detailed description of several preferred embodiments thereof.

In general, my tire-repair method comprises the steps of introducing clottable proteins of any one of a number of mammalian body fluids at the region of puncture, and then adding a suitable clotting agent. The clottable material is injected through the tire valve by any suitable means, e.g. a pressurized container. The clotting agent is preferably introduced in the same manner along with a supply of compressed air, thereby causing the protein solution to foam and coat the entire interior of the tire. As the foamed clottable solution then clots, it leaves a thin air-tight seal along the interior tube walls and at the point of rupture.

In a first composition of the injected solution which I have found to be particularly effective in repairing pneumatic tires, I employ suitable materials for the formation of a blood clot along the walls of the tube. Clotting occurs in the blood of vertebrates through the conversion of soluble protein, fibrinogen, to an insoluble fibrous form known as fibrin. This change is produced by the enzyme thrombin which is not normally present in blood plasma, but is formed during the initiation of clotting from prothrombin, a plasma constituent. Conversion of prothrombin to thrombin requires calcium ions and a substance known as thromboplastin, which is formed when blood platelets break down. The steps in the clotting of blood may therefore be summarized as follows:

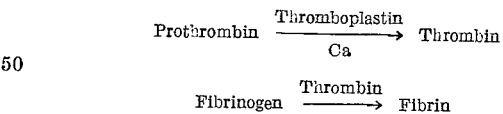

I have employed fibrinogen as the clottable protein in my method, the fibrinogen being obtained by precipitation through suitable well-known chemical means. The clotting agent subsequently added to the fibrinogen is the enzyme thrombin which is also obtained by appropriate known chemical means.

For purposes of exemplification only, the following porportions of these substances may be used: 30 cc. of 2½ percent fibrinogen in 0.1 normal sodium oxalate solution, as the "clottable material"; and 10 cc. normal solution of CaC with an excess of thrombin, as the "clotting agent." The clottable material is first introduced through the tire valve, followed by the clotting agent and immediate inflation of the tire. When injected into a conventional high-pressure bicycle tire, I have found that approximately one-fourth of the liquid is formed into the clot, the rest of the solution remaining in liquid form. This excess liquid may be drained out of the tire through the valve, if desired, or may remain in the tire during subsequent use without any marked effect upon the tire.

These solutions, together with the compressed air provided, produce a foam which flows throughout the tire interior and forms a continuous clot along this entire surface. Due to the escape of air through the puncture during inflation, the foam will be more concentrated at that point, thereby resulting in a thicker clot at the rupture than elsewhere in the tube.

I have also found that these blood clotting substances contract as they clot, and apparently have a pinching effect upon the sides of the rupture, pulling them together and thus increasing the efficiency of the seal. In many cases I have found that the clot formed is dumbell-shaped, having widened portions on opposite sides of the punctured tube wall, thereby increasing the resistance of the tube to re-puncture or loss of air at that point.

The clottable material can alternatively comprise whole citrated or oxalated mammalian plasma. The citrate or oxalate material combines with the calcium ions in the blood and thereby prevents the conversion of prothrombin to thrombin. In this case, clotting is induced by adding solutions containing calcium ions, these ions permitting the formation of thrombin which in turn reacts with the fibrinogen to form the clot.

A third suggested clottable protein for achieving repair of tire punctures, is that of certain mammalian secretions such as milk. In such a case, clotting is induced by appropriate enzymatic or chemical means. For example, caseinogen, a protein present in milk, may be used as the clottable material; the clotting agent will then be a solution containing calcium ions and a milk-clotting enzyme known as rennin. The calcium ions and rennin convert the caseinogen material to a clot formed of casein, an insoluble material having generally the same properties as a blood clot.

With each of the above clotting solutions, the introduction of these materials in the tire to form the desired clot is accomplished preferably by first opening the tire valve and injecting the clottable material. The clotting agent is next injected simultaneously with a sufficiently large volume of compressed air to return the tire to its normal pressure. This air also acts to form the foam which flows throughout the tube and concentrates at the region of puncture. If desired, the clotting agent may be added to the clottable protein before introduction into the tire, provided the latter operation is performed before the clotting reaction has occurred.

These clotting solutions may also be employed where the tube is to be repaired along its outer surface, in which case the clot may be formed without the need for compressed air or the formation of a foam.

I have found the method and solutions described above to be highly effective with most punctures, and to provide a permanent seal both at the point of rupture and throughout the interior of the tube.

It is apparent that various changes and modifications may be made in the composition of the solutions described above and in the method of introducing such solutions at the region of puncture without departing from the spirit of the invention or the scope of the appended claims.

Having thus described my invention, I claim:

1. A method for repairing punctures in pneumatic tires and the like comprising providing a clottable protein of mammalian blood at the region of said puncture together with a suitable clotting agent, thereby producing a clot at said region and sealing said puncture.

2. A method for repairing punctures in pneumatic tires and the like, comprising first introducing a clottable protein of mammalian blood at the region of said puncture, and subsequently introducing a suitable clotting agent at said region, thereby producing a clot at said region and sealing said puncture.

3. A method for repairing punctures in pneumatic tires and the like comprising:
   (a) introducing a clottable protein of mammalian blood within the interior of said tire through the tire valve;
   (b) introducing a suitable clotting agent for said protein within said tire through said valve;
   (c) and transferring said clottable protein and said clotting agent to the region of puncture prior to clotting of said protein, said protein then clotting at said region and sealing said puncture.

4. A method for repairing punctures in pneumatic tires and the like comprising:
   (a) introducing a clottable protein of mammalian blood within the interior of said tire through the tire valve;
   (b) introducing a suitable clotting agent for said protein within said tire through said valve;
   (c) and injecting air into said tire so as to produce a foaming of said protein and clotting agent prior to clotting, said foam contacting the region of puncture and forming a clot thereupon, sealing said puncture.

5. A method for repairing punctures in pneumatic tires and the like comprising:
   (a) introducing a clottable protein of mammalian blood within the interior of said tire through the tire valve;
   (b) and introducing a suitable clotting agent for said protein simultaneously with a volume of high-pressure gas through said valve into said tire, said gas producing a foaming of said protein and clotting agent, said foam contacting the region of puncture and forming a clot thereupon, sealing said puncture.

6. A method for repairing punctures in pneumatic tires and the like, comprising providing a solution including fibrinogen at the region of said puncture together with a solution including thrombin, thereby producing a clot at said region and sealing said puncture.

7. A method for repairing punctures in pneumatic tires and the like, comprising inttroducing fibrinogen at the region of said puncture, and subsequently introducing thrombin at said region, thereby producing a clot at said region and sealing said puncture.

8. A method for repairing punctures in pneumatic tires and the like, comprising:
   (a) introducing fibrinogen within the interior of said tire through the tire valve;
   (b) introducing thrombin within said tire through said valve;
   (c) and transferring said fibrinogen and thrombin, prior to clotting of said fibrinogen, to the region of puncture, said fibrinogen then clotting at said region and sealing said puncture.

9. A method for repairing punctures in pneumatic tires and the like, comprising:
   (a) introducing fibrinogen within the interior of said tire through the tire valve;
   (b) introducing thrombin within said tire through said valve;
   (c) and injecting air into said tire so as to produce a foaming of said fibrinogen and thrombin, said foam contacting the region of puncture and forming a clot thereupon, sealing said puncture.

10. A method for repairing punctures in pneumatic tires and the like, comprising:
    (a) introducing fibrinogen within the interior of said tire through the tire valve;
    (b) and introducing thrombin simultaneously with a volume of high-pressure gas through said valve into said tire, said gas producing a foaming of said fibrinogen and thrombin, said foam contacting the region of puncture and forming a clot thereupon, sealing said puncture.

11. A method for repairing punctures in pneumatic tires and the like, comprising introducing whole citrated mammalian plasma at the region of said puncture, together with a solution containing calcium ions, thereby producing a clot at said region and sealing said puncture.

12. A method for repairing punctures in pneumatic tires and the like, comprising:
   (a) introducing whole citrated mammalian plasma within the interior of said tire through the tire valve;
   (b) introducing a solution containing calcium ions within said tire through said valve;
   (c) and injecting air into said tire so as to produce a foaming of said plasma and solution prior to clotting of said plasma, said foam contacting the region of puncture and forming a clot thereupon, sealing said puncture.

13. A method for repairing punctures, in pneumatic tires and the like, comprising introducing whole oxalated mammalian plasma at the region of said puncture, together with a solution containing calcium ions, thereby producing a clot at said region and sealing said puncture.

14. A method for repairing punctures in pneumatic tires and the like, comprising:
   (a) introducing whole oxalated mammalian plasma within the interior of said tire through the tire valve;
   (b) introducing a solution containing calcium ions within said tire through said valve;
   (c) and injecting air into said tire so as to produce a foaming of said plasma and solution prior to clotting of said plasma, said foam contacting the region of puncture and forming a clot thereupon, sealing said puncture.

15. A method for repairing punctures in pneumatic tires and the like, comprising introducing clottable proteins of mammalian blood at the region of said puncture, together with a suitable clotting agent for said proteins, thereby producing a clot at said region and sealing said puncture.

16. A method for repairing punctures in pneumatic tires and the like, comprising:
   (a) introducing clottable proteins of mammalian blood within the interior of said tire through the tire valve;
   (b) introducing a solution containing a suitable clotting agent for said proteins within said tire through said valve;
   (c) and injecting air into said tire so as to produce a foaming of said blood and solution prior to clotting of said blood, said foam contacting the region of puncture and forming a clot thereupon, sealing said puncture.

17. A method for repairing punctures in pneumatic tires and the like, comprising introducing caseinogen at the region of said puncture together with a solution containing calcium ions and rennin, thereby producing a clot at said region and sealing said puncture.

18. A method for repairing punctures in pneumatic tires and the like, comprising:
   (a) introducing caseinogen within the interior of said tire through the tire valve;
   (b) introducing a solution containing calcium ions and rennin within said tire through said valve;
   (c) and injecting air into said tire so as to produce a foaming of said caseinogen and solution prior to clotting of said caseinogen, said foam contacting the region of puncture and forming a clot thereupon, sealing said puncture.

References Cited

UNITED STATES PATENTS

| | | | |
|---|---|---|---|
| 851,960 | 4/1907 | Pfleumer | 156—78 |
| 2,385,803 | 10/1945 | Cohn | 106—124 |
| 1,819,880 | 8/1931 | Dunham | 106—138 |
| 3,059,253 | 10/1962 | Sager. | |

FOREIGN PATENTS

| | | |
|---|---|---|
| 9,727 | 1907 | Great Britain. |
| 521,030 | 5/1940 | Great Britain. |

OTHER REFERENCES

Science News Letter, vol. 78, No. 336, Nov. 19, 1960, p. 336.

EARL M. BERGERT, *Primary Examiner.*

CLIFTON B. COSBY, *Examiner.*